United States Patent
Roberts et al.

(10) Patent No.: US 11,916,252 B2
(45) Date of Patent: Feb. 27, 2024

(54) VAPOR PRESSURE BARRIERS FOR LEAD ACID BATTERIES FOR IMPROVED WATER LOSS PERFORMANCE, SEPARATORS, SYSTEMS, AND METHODS OF MANUFACTURE AND USE THEREOF

(71) Applicant: Daramic, LLC, Charlotte, NC (US)

(72) Inventors: Margaret R. Roberts, Owensboro, KY (US); Jeffrey K. Chambers, Philpot, KY (US); James Perry, Utica, KY (US); J. Kevin Whear, Utica, KY (US)

(73) Assignee: Daramic, LLC, Charlotte, NC (US)

( * ) Notice: Subject to any disclaimer, the term of this patent is extended or adjusted under 35 U.S.C. 154(b) by 448 days.

(21) Appl. No.: 17/063,735

(22) Filed: Oct. 6, 2020

(65) Prior Publication Data
US 2021/0020883 A1   Jan. 21, 2021

Related U.S. Application Data

(62) Division of application No. 15/054,821, filed on Feb. 26, 2016.
(Continued)

(51) Int. Cl.
*H01M 50/383* (2021.01)
*H01M 10/12* (2006.01)

(52) U.S. Cl.
CPC ......... *H01M 50/383* (2021.01); *H01M 10/12* (2013.01); *H01M 2220/20* (2013.01); *Y02E 60/10* (2013.01)

(58) Field of Classification Search
CPC ............... H01M 50/383; H01M 10/12; H01M 2220/20; Y02E 60/10; Y02T 90/40; B60L 50/72
See application file for complete search history.

(56) References Cited

U.S. PATENT DOCUMENTS 1,512,485 A * 10/1924 Pouchain .............. H01M 10/22
429/205
5,246,798 A    9/1993 Yaacoub
(Continued)

FOREIGN PATENT DOCUMENTS

EP          0973215       1/2000
JP          S60153376     8/1985
(Continued)

OTHER PUBLICATIONS

English Translation of JP5798962.*

*Primary Examiner* — Stephen J Yanchuk
(74) *Attorney, Agent, or Firm* — Hammer & Associates, P.C.

(57) ABSTRACT

New or improved lead acid batteries with vapor pressure barriers and/or improved battery separators, as well as systems, vehicles, and/or methods of manufacture and/or use thereof are disclosed herein. In at least select embodiments, the instant disclosure provides new or improved lead acid batteries with a vapor pressure barrier. In at least select embodiments, the instant disclosure provides new or improved lead acid battery vapor pressure barriers along with new or improved battery separators, and/or methods of manufacture and/or use thereof. In at least select embodiments, the instant disclosure provides a new or improved lead acid battery with a vapor pressure barrier that reduces the water loss from the battery. In at least select embodiments, a method of reducing the water loss of a lead acid battery may include providing a vapor pressure barrier, such as a layer of oil, inside the lead acid battery along with an improved battery separator.

14 Claims, 1 Drawing Sheet

Related U.S. Application Data

(60) Provisional application No. 62/121,112, filed on Feb. 26, 2015.

(56) References Cited

U.S. PATENT DOCUMENTS

| | | | |
|---|---|---|---|
| 5,660,949 | A | 8/1997 | Lajeunesse |
| 5,945,236 | A | 8/1999 | Willis |
| 5,962,164 | A * | 10/1999 | Lajeunesse ........... H01M 10/08 |
| | | | 429/204 |
| 7,923,151 | B2 | 4/2011 | Lam et al. |
| 2001/0049051 | A1 | 12/2001 | Jones et al. |
| 2002/0061434 | A1 | 5/2002 | Holden et al. |
| 2003/0113612 | A1 | 6/2003 | Jones et al. |
| 2004/0091777 | A1 | 5/2004 | Lam et al. |
| 2012/0094183 | A1 | 4/2012 | Deiters et al. |

FOREIGN PATENT DOCUMENTS

| | | | |
|---|---|---|---|
| JP | 10223251 | | 8/1998 |
| JP | 2001148256 | | 5/2001 |
| JP | 200828278 | | 11/2008 |
| JP | 2010205572 | | 9/2010 |
| JP | 5798962 | * | 3/2012 |
| WO | WO2010058240 | | 5/2010 |
| WO | WO2012040436 | | 3/2012 |

* cited by examiner

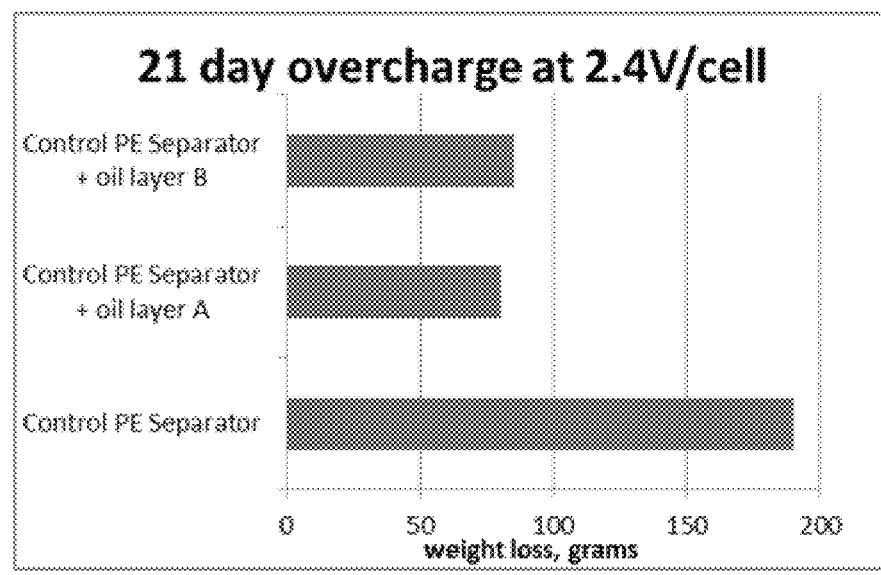

VAPOR PRESSURE BARRIERS FOR LEAD ACID BATTERIES FOR IMPROVED WATER LOSS PERFORMANCE, SEPARATORS, SYSTEMS, AND METHODS OF MANUFACTURE AND USE THEREOF

CROSS-REFERENCE TO RELATED APPLICATION

This application is a divisional of U.S. application Ser. No. 15/054,821, filed Feb. 26, 2016, which claims priority to and the benefit of U.S. Provisional Patent Application No. 62/121,112, filed Feb. 26, 2015, which is incorporated herein by reference in its entirety.

FIELD OF THE INVENTION

The instant disclosure or invention is directed to new or improved lead acid batteries and components therefor, vapor pressure barriers, separators, systems, vehicles, and/or related methods of production and/or use thereof, and to various vapor pressure barriers and/or systems of combinations of vapor pressure barriers and separators for use in a lead acid battery, and to batteries and/or vehicles including such vapor pressure barriers, systems or combinations. In at least select embodiments, the instant disclosure or invention is directed toward a new or improved vapor pressure barrier or barriers, sometimes in conjunction with improved battery separators, for lead acid batteries and related products, devices or vehicles including such batteries, and/or methods for creating such vapor pressure barriers and/or battery separators. In at least select embodiments, the instant disclosure or invention relates to new or improved lead acid batteries and vehicles, and/or methods of manufacture and/or use thereof for enhancing the water loss performance of the lead acid battery, which battery may be in a particular system, device or vehicle.

BACKGROUND OF THE INVENTION

Lead acid batteries have evolved, over time, as the demands for a source of mobile electric power have grown. There are two main types of lead acid batteries: flooded lead acid batteries and VRLA (valve regulated lead acid) batteries. The instant disclosure may be particularly useful for flooded batteries which are commonly used all over the world. A newer type of flooded lead acid battery is an EFB battery, or an enhanced flooded battery. For example, the new, ever growing requirements for Stop Start car technology (or Idle Stp Start (ISS)) demands a better battery which may be the "enhanced" flooded battery, or EFB. Deep cycle batteries used for various industrial applications, mining equipment, golf cars, and other applications, particularly those where periodic overcharge is required, and stationary applications requiring constant overcharge, may also benefit from reduced water loss technologies. Such systems, and other systems, will see a reduction in required maintenance, less frequent watering required, and/or longer service life, even in cases of irregular maintenance schedules.

Water loss in lead acid batteries is a known problem and may occur for many different reasons. For example, water loss (reduced level of electrolyte due to reduced quantity of water in the electrolyte) may occur in lead acid batteries as the overvoltage of hydrogen is exceeded at the electrodes. This may be typical and may occur to some extent as the electrochemical mechanism dictates. The effects of water loss may be amplified in climates with sustained high temperature. Water loss has been identified as a major contributor to at least the following critical failure modes in lead acid batteries: plate dehydration, which may lead to battery failure; dryout in a sealed VRLA battery, which may lead to potential thermal runaway; negative plate sulfation, which may lead to reduced charge acceptance and/or reduced cycle life; and/or increased specific gravity of electrolyte, which may lead to negative plate sulfation and/or positive grid corrosion.

Water loss in a lead acid battery can be seen through: reduced level of electrolyte leading to dryout, exposing welds, plates and connections to corrosion and causing early failure; increasing electrolyte acid concentration, reduced capacity, negative plate sulfation, positive grid corrosion leading to early failure; and/or outgassing of $H_2$ and $O_2$ gases, possibly creating an explosion and handling hazard and requiring venting. As such, reducing water loss in lead acid batteries may help eliminate: plate dehydration leading to early capacity loss and shortened life; negative plate sulfation, reducing life; and/or positive grid corrosion, reducing performance by robbing CCA (cold cranking amperage) and capacity and life. Water loss from lead acid batteries may be mainly due to electrolysis and subsequent gassing of hydrogen and oxygen, which may be more apparent in high temperature climates or applications.

EFBs may suffer from any of these water loss scenarios, including evaporation and electrolysis of water. Water loss, whether through evaporation and/or electrolysis, is commonly known to lower the performance and/or life of the EFB. As such, many methods have been developed to combat this drawback, including VRLA/AGM type batteries. However, even in a sealed VRLA/AGM battery, for example, the potential for dryout is present, and a potential thermal runaway could occur because of water loss. Thus, it can be said that various known and/or already-developed methods of combatting water loss in lead acid batteries may provide little reduction in water loss and may require high costs that may not match the value brought forth by various developed methods.

As such, there is clearly a need to develop lead acid batteries with improved water loss performance, and/or the ability to reduce evaporation and/or electrolysis of water in the electrolyte of a flooded lead acid battery, that is cost effective.

The instant disclosure is designed to address at least certain aspects of the problems or needs discussed above.

SUMMARY OF THE INVENTION

In accordance with at least selected embodiments, aspects, or objects, the instant disclosure or invention may address the above mentioned needs, issues and/or problems, and/or provides or is directed to new or improved vapor pressure barriers for lead acid batteries as well as various battery separators for lead acid batteries, and/or lead acid batteries and related products, devices or vehicles comprising such lead acid batteries with such vapor pressure barriers, systems, related methods, and/or the like. In general, the instant disclosure provides new or improved lead acid battery vapor pressure barriers and/or methods of manufacture and/or use thereof. In at least select embodiments, the instant disclosure provides a new or improved lead acid battery with a vapor pressure barrier and/or a material or battery separator that reduces the water loss from the battery. In one embodiment, a method of reducing the water loss of a lead acid battery may include providing a vapor pressure barrier inside the lead acid battery anywhere between the external environment and the electrolyte within the battery.

The instant disclosure or invention is directed to new or improved lead acid batteries and components therefor, vapor pressure barriers, separators, systems, devices, products, vehicles, and/or related methods of production and/or use thereof, and to various vapor pressure barriers and/or systems of combinations of vapor pressure barriers and/or separators for use in a lead acid battery, and to batteries and/or vehicles including such vapor pressure barriers, systems, batteries, or combinations thereof. In at least select embodiments, the instant disclosure or invention is directed toward a new or improved vapor pressure barrier or barriers, sometimes in conjunction with improved battery separators, for lead acid batteries and related products, devices or vehicles including such batteries, and/or methods for creating such vapor pressure barriers and/or battery separators. In at least select embodiments, the instant disclosure or invention relates to new or improved lead acid batteries and vehicles, and/or methods of manufacture and/or use thereof for enhancing the water loss performance of the lead acid battery, which battery may be in a particular system, device or vehicle.

BRIEF DESCRIPTION OF THE DRAWING

The FIG. includes a graph showing the reduction in water loss for batteries incorporating one or more vapor pressure barriers according to various embodiments, aspects or objects of the invention described herein.

DETAILED DESCRIPTION OF THE INVENTION

The instant disclosure provides various vapor pressure barriers for a lead acid battery and a lead acid battery having one or more of such vapor pressure barriers as well as various battery separators inside lead acid batteries, and various improved batteries inside improved vehicles comprising the same. The vapor pressure barriers described herein may be for reducing water loss (typically water vapor) from the lead acid battery. As such, the instant disclosure provides a lead acid battery with reduced or improved water loss. Reducing and/or improving water loss, as used herein, means less water is lost from the battery over time compared with previously known batteries. By way of example, the FIGURE (described in more detail below) provides such an example of reduction in water loss for lead acid batteries employing a battery separator and/or a vapor pressure barrier according to various embodiments described herein.

The various vapor pressure barriers for a lead acid battery of the instant disclosure may provide reduced and/or improved water loss (a reduction in the amount of water lost over typical batteries) by any one or more of the listed approaches or means in a lead acid battery. In select embodiments, the vapor pressure barrier may provide additional surface area for coalescing of vapor and/or mist. In still other embodiments, the vapor pressure barrier may act as a de-mister for vapor, mist, fog, and/or droplets trying to escape from the lead acid battery and create water loss. In select embodiments, the vapor pressure barrier may provide a tortuous path for $H_2$ and $O_2$ gases to escape. In select embodiments, the vapor pressure barrier may provide a means of bringing catalytic options for $H_2/O_2$ recombination. In select embodiments, the vapor pressure barrier may provide a means of reducing vapor carried out of the battery during overcharge or periods of intentional or unintentional gassing. In select embodiments, the vapor pressure barrier may reduce the non-isopiestic (or non-equal pressure) tendency of the lead acid battery to have uneven electrolyte levels among battery cells. By way of example, in some lead acid batteries, water vapor may go from one cell to another such that the electrolyte level in one cell of the battery is higher than in another cell of the battery, which is undesirable and may lead to strong/weak sister cells in the battery and could reduce battery life, capacity and power delivery through, for example, grid corrosion, corrosion of top lead or the conductive lead above the electrolyte level, which could lead to cell failure or dead cells, and so forth.

The vapor pressure barrier for a lead acid battery of the instant disclosure may be provided in many positions and/or locations for reducing and/or improving water loss of the battery. In select embodiments, the vapor pressure barrier may be positioned between the operating electrolyte and the external atmosphere. In select embodiments, the vapor pressure barrier may be positioned in the head space of the battery. In select embodiments, the vapor pressure barrier may be positioned in contact with the electrolyte. In other select embodiments, the vapor pressure barrier may be positioned within the electrolyte.

The vapor pressure barrier for a lead acid battery of the instant disclosure may be any material for reducing and/or improving the water loss of the lead acid battery. In select embodiments, the vapor pressure barrier may include any material of suitable density that will float on top of the electrolyte, have low solubility in the electrolyte and/or remain flowable/pourable over the operating temperatures of the battery.

And such vapor pressure barrier or barriers may be, according to this invention, used in conjunction with a battery separator designed to have improved water loss features of its own. For example, various battery separators may be used in flooded lead acid batteries that include, for instance, various polyethylene battery separators, particularly those known and commercially available from Daramic, LLC. To improve the water loss performance of a battery incorporating such a battery separator, such a polyethylene battery separator may be coated with a material that provides for unexpected improvement in water loss performance for a flooded lead acid battery. Such materials include the materials described in, for example, U.S. Patent Publication No. 2012/0094183, which is hereby incorporated by reference in its entirety. Alternatively, such materials may include the materials described in, for example, U.S. Provisional Patent Application Ser. No. 62/121,120 filed Feb. 26, 2015, and the related non-provisional U.S. patent application Ser. No. 15/054,504 filed Feb. 26, 2016, which is being filed concurrently herewith, both of which are hereby incorporated by reference in their entireties. Thus, in various embodiments of the present invention, a synergistic and unexpected level of water loss improvement may result from providing a lead acid battery that incorporates an improved battery separator as well as one or more vapor pressure barriers somewhere between the external environment and the electrolyte and/or somewhere within the electrolyte within the battery.

In select embodiments, the vapor pressure barrier for a lead acid battery according to the instant disclosure may include an oil layer. In select oil layer embodiments, the oil may be some sort of mineral oil, for example, a white mineral oil. In various embodiments, the oil layer may be modified by adding electrolyte soluble components that are mobile into the electrolyte phase to provide additional benefit by means of increasing the electrochemical overpotential value which is responsible for gas evolution in the cell. Said synergistic components may be inorganic salts such as zinc sulfate, bismuth-containing compounds, various nonionic organic compounds including surfactants, naturally derived or synthetically derived liquid polymeric compounds, oxygenated polymers, PPO (polypropylene oxide), PEG/PEO/POE (polyethylene glycol), oxygenated oils, water soluble polymers, and/or materials such as those described in U.S. Pat. No. 2,938,887, which is hereby incorporated by reference in its entirety, oxidation products of cellulosic materials and other organic and inorganic compounds having suitable solubility and dispersive properties in the aforementioned oil layer and having some degree of solubility in the electrolyte thus portioned wholly or partially within the oil and/or electrolyte phases. In one particular example, PVA or polyvinyl acetate, or some other material such as an encapsulation material may be used as a delivery method or system for providing one or more oil as a vapor pressure barrier to the flooded lead acid battery such that the PVA outer layer or shell or encapsulation material disintegrates in the electrolyte (is soluble in the electrolyte) and the oil remains to serve as a vapor pressure barrier or part of a vapor pressure barrier.

The oil layer may be any of various oil layers, including, but not limited to, naturally or synthetically derived oils, and/or paraffinic, naphthenic, PAO, polyester functionalities among other natural base and blended oils and synthetic oils including oils formulated from natural gas, and other petroleum gases. In various embodiments, the oil or oils used as part of a vapor pressure barrier according to this invention may be selected on the basis of insolubility in the electrolyte. In addition, selection of one or more oils to operate in a vapor pressure barrier according to this invention includes taking into account viscosity properties of the various oils which may allow for easy addition to the battery under extremes in climate. In addition, the selection of various oils for use as part of a vapor pressure barrier in the present invention further includes selecting oils which may be known to be stable and/or resistant to oxidative attack and may contain, for example, only small quantities of byproducts from refining. In addition, the selection of various oils to use as part of a vapor pressure barrier according to the present invention may include selecting one or more oils which have been demonstrated to be electrochemically compatible by means of cyclic voltammetry analysis. Examples of such oils may include, but are not limited to, those utilized in the transformer, turbine power, consumer products and biomedical industries.

In select embodiments, the vapor pressure barrier for a lead acid battery according to the instant disclosure may include a nonwoven layer. In select nonwoven layer embodiments, the nonwoven layer may be positioned above the electrolyte. In other nonwoven layer embodiments, the nonwoven layer may be positioned within the electrolyte. In some nonwoven layer embodiments one or more oils as discussed above may be applied on such a nonwoven layer. In other nonwoven layer embodiments, one or more oils as discussed above may be contained within such a nonwoven layer. In various embodiments, the nonwoven may contain oil that does not completely saturate the pores but instead spreads over the surface of such a nonwoven to allow for repelling the gas mist.

In other select nonwoven layer embodiments, the nonwoven layer may be applied over the headspace. In other select nonwoven layer embodiments, the nonwoven layer may be attached to the battery lid, for example, it may be insert molded into such a lid or around the periphery of the vent orifices on the bottom of such a lid. In other select nonwoven layer embodiments, the nonwoven layer may be assembled as discrete pieces applied inside the headspace of each cell during assembly. In other select nonwoven layer embodiments, the nonwoven layer may be assembled between the battery lid and the case. The nonwoven layer of the vapor pressure barrier may be any nonwoven layer. In select nonwoven embodiments, the nonwoven layer may include synthetic fibers, a glass mat, a melt stable nonwoven, a blended nonwoven, the like, other nonwoven, woven, or material layers that provide a vapor pressure barrier, and/or combinations thereof. In select embodiments, the vapor pressure barrier for a lead acid battery according to the instant disclosure may include a porous membrane such as a thin, flat, porous or microporous polymeric membrane or mat (such as a filled or unfilled microporous polyethylene membrane or mat). Positioning of such a porous membrane may vary in the same ways described above as for a nonwoven layer.

In select embodiments, the vapor pressure barrier for a lead acid battery according to the instant disclosure may include a catalyst. The catalyst may be any catalyst for reducing and/or improving water loss of the lead acid battery. In select embodiments the catalyst may promote $O_2/H_2$ recombination with the driving force of energetically favorable water formation. Thus water may be cycled (water>gas>water>gas> . . . ) over the cycle life of the battery resulting in highly optimal water loss conditions. The catalyst may include one or more materials that may bring about the addition of atomic oxygen to atomic hydrogen to efficiently achieve the condensation to liquid water. Preferred catalytic choices may include those materials which react efficiently to form water in low-pH oxidative environments. The substrate platform for catalytic recombination can be synthetic nonwoven material, various porous membranes stable to the battery environment, and/or the battery case, for example, the top of the case and the venting structures comprised within the case. By way of example only, vapor deposition of platinum on a membrane or fibrous structure could provide a vapor pressure barrier for use within a flooded lead acid battery.

A lead acid battery may be provided, made or manufactured according to the instant disclosure with any of the various embodiments of the vapor pressure barrier and/or separators as shown and/or described herein. The lead acid battery, like a flooded lead acid battery, or an EFB, may be improved with any of the various embodiments of the vapor pressure barrier and the various battery separators as shown and/or described herein. The improvements of the lead acid battery with any of the various embodiments of the vapor pressure barrier and battery separators as shown and/or described herein may include, but are not limited to, having reduced and/or improved water loss. Although a flooded lead acid battery or an enhanced flooded battery may be the preferred batteries, other batteries may benefit from the inventive barriers and/or separators. For example, automotive, deep cycle or industrial batteries, VRLA, AGM, VRLA AGM, gel electrolyte, and/or the like. Also, deep cycle batteries used for various industrial applications, mining equipment, golf cars, and other applications, particularly those where periodic overcharge is required, and stationary applications requiring constant overcharge, may also benefit from reduced water loss technologies. Such batteries or systems, and other batteries or systems, will see a reduction in required maintenance, less frequent watering required, and/or longer service life, even in cases of irregular maintenance schedules.

The instant disclosure also provides a method of reducing water loss of a lead acid battery. The method may include providing a vapor pressure barrier according to any of the various embodiments shown and/or described herein. In select embodiments, the method of reducing water loss of a lead acid battery may include reducing vapor loss from the vented lead acid battery. In select embodiments of the instant method of reducing water loss of a lead acid battery, the vapor pressure barrier may be provided between the operating electrolyte and the case and/or the external atmosphere. In select embodiments of the instant method of reducing water loss of a lead acid battery, the vapor pressure barrier may: provide additional surface area for coalescing of vapors; provide a tortuous path for $H_2$ and $O_2$ gases to escape; provide a means of bringing catalytic options for $H_2/O_2$ recombination; provide a means of reducing vapor carried out of the battery during overcharge or periods of intentional or unintentional gassing; reduce the non-isopiestic tendency of the lead acid battery to have uneven electrolyte levels which leads to strong/weak sister cells and reduces life, capacity and power delivery through grid corrosion, corrosion of top lead, and/or combinations thereof.

In one particular embodiment of the present invention, a battery having improved water loss characteristics is produced by creating a physical vapor pressure barrier between the electrolyte and the head space of the battery. In such an embodiment, the water loss reduction compared with control batteries may be more than a 25% reduction in water loss, in some embodiments, more than a 35% reduction in water loss, in still some embodiments, more than a 45% reduction in water loss, and in some embodiments, more than a 55% reduction in water loss compared with control batteries. In such embodiments, a battery system may be created including an improved battery separator including, for example, a polyethylene battery separator coated with a material specifically designed for improving water loss characteristics of a battery (such as a material more fully described in U.S. Patent Publication No. 2012/0094183, incorporated by reference herein); then, adding electrolyte to the battery; and then, adding a layer of oil above the electrolyte to serve as a vapor pressure barrier for the battery system. In various embodiments, up to 5 mL of oil per battery cell is added to create such a battery; in other embodiments, up to 10 mL of oil per battery cell is added; in still other embodiments, up to 30 mL of oil per battery cell is added; in other embodiments, up to 60 mL of oil per battery cell is added.

Examples

Various laboratory assembled batteries were created to determine the level of water loss improvement the battery experienced using various embodiments of the present invention. Various batteries were assembled in a lab using battery separators commercially available from Daramic, LLC and then creating a vapor pressure barrier in conjunction with the use of such a separator. The FIGURE FIG. 1 illustrates a bar graph of water loss in grams of weight loss over a 21 day overcharge at 2.4 Volts/cell (14.4 Volts total for a 6-cell, 12-Volt battery) for various laboratory assembled batteries with vapor pressure barriers according to select embodiments of the instant disclosure. These were vented batteries in a 60° C. water bath. The battery with a control polyethylene separator, commercially available from Daramic, LLC and containing various water loss additive(s), as the battery separator is used for reference as a control. Then, two batteries were assembled using a vapor pressure barrier, one with a layer of OH A, and one with a layer of OH B. The results show an unexpectedly high level of water loss reduction when combining the water loss technology of an enhanced battery separator with the water loss technology of an improved vapor pressure barrier for the system. By way of example, the system with the control polyethylene battery separator revealed water loss in grams of between 150 and 200 grams, whereas the systems with a layer of oil reduced that water loss down to under 100 grams over the period of overcharge. Also, it is believed that the unexpected improvement in water loss results would also be high and unexpected relative to a standard polyethylene battery separator with an oil layer but without a coating of or the addition of a water loss additive (such as the additive(s) associated with the Daramic polyethylene battery separator used as the control in the graph of the FIGURE). Thus, with the present invention, one important water loss improvement technology, improving it by adding physical vapor pressure barrier(s) to the system, is combined with another important water loss improvement technology, improving it by adding an improved battery separator (for example, a coated separator or a separator including one or more novel additives for reducing water loss in a flooded lead acid battery system), with potentially synergistic and unexpected results.

In accordance with at least certain embodiments, aspects or objects, new or improved lead acid batteries with vapor pressure barriers and/or improved battery separators, systems, and/or methods of manufacture and/or use thereof are contemplated, provided or disclosed. In at least select embodiments, the instant disclosure provides new or improved lead acid batteries with a vapor pressure barrier or system. In at least select embodiments, the instant disclosure provides new or improved lead acid battery vapor pressure barriers along with new or improved battery separators, and/or methods of manufacture and/or use thereof. In at least select embodiments, the instant disclosure provides a new or improved lead acid battery with a vapor pressure barrier that reduces the water loss from the battery. In at least select embodiments, a method of reducing the water loss of a lead acid battery may include providing a vapor pressure barrier, such as a layer of oil, inside the lead acid battery along with an improved battery separator.

In at least select embodiments, aspects or objects, the present disclosure or invention may address the above needs, and/or may provide or be directed to new or improved lead acid batteries and components therefor, vapor pressure barriers, separators, systems, vehicles, and/or related methods of production and/or use thereof, and to various vapor pressure barriers and/or systems of combinations of vapor pressure barriers and separators for use in a lead acid battery, and to batteries and/or vehicles including such vapor pressure barriers, systems or combinations. In at least select embodiments, the instant disclosure or invention is directed toward a new or improved vapor pressure barrier or barriers, sometimes in conjunction with improved battery separators, for lead acid batteries and related products, devices or vehicles including such batteries, and/or methods for creating such vapor pressure barriers and/or battery separators. In at least select embodiments, the instant disclosure or invention relates to new or improved lead acid batteries and vehicles, and/or methods of manufacture and/or use thereof for enhancing the water loss performance of the lead acid battery, which battery may be in a particular system, device or vehicle.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein. Many other modifications and variations of the present invention are possible to the skilled practitioner in the field in light of the teachings herein. It is therefore understood that, within the scope of the claims, the present invention can be practiced other than as herein specifically described.

The invention claimed is:

1. A battery separator comprising an oil layer on a porous membrane or mat, wherein the oil layer comprises one or more oils selected from the group consisting of naturally derived oils and synthetically derived oils, wherein
the oil layer further comprises a material that is soluble in a lead acid battery electrolyte and capable of encapsulating the one or more oils.

2. The battery separator of claim 1, wherein the oil layer comprises a paraffinic oil.

3. The battery separator of claim 1, wherein the oil layer comprises a napthenic oil.

4. The battery separator of claim 1, wherein the oil layer comprises a polyalphaolefin (PAO) oil.

5. The battery separator of claim 1, wherein the oil layer comprises an oil with polyester functionalities.

6. The battery separator of claim 1, wherein the oil layer comprises a mineral oil.

7. The battery separator of claim 6, wherein the oil layer comprises white mineral oil.

8. The battery separator of claim 1, wherein the oil layer comprises two or more naturally derived oils, two or more synthetically derived oils, or a mixture of at least one naturally derived oil and at least one synthetically derived oil.

9. The battery separator of claim 1, wherein the oil layer is provided on a porous membrane.

10. The battery separator of claim 9, wherein the porous membrane is microporous.

11. The battery separator of claim 9, wherein the porous membrane is a filled or unfilled polyethylene porous membrane.

12. The battery separator of claim 1, wherein the oil layer is provided on a porous mat.

13. The battery separator of claim 12, wherein the porous mat is microporous.

14. The battery separator of claim 12, wherein the porous mat is a filled or unfilled polyethylene porous mat.

* * * * *